United States Patent

[11] 3,563,472

[72] Inventor Johann S. Skaptason
Leawood, Kans.
RR #1, Stilwell, Kans. 66085

[21] Appl. No. 744,853
[22] Filed July 15, 1968
[45] Patented Feb. 16, 1971

[54] APPARATUS FOR PESTICIDE SPRAYING
4 Claims, 4 Drawing Figs.

[52] U.S. Cl. .......... 239/511, 239/122, 239/391
[51] Int. Cl. .......... B05b 1/28
[50] Field of Search .......... 239/508—512, 122, 391

[56] References Cited

UNITED STATES PATENTS

| | | | |
|---|---|---|---|
| 135,649 | 2/1873 | Law .......... | 239/510X |
| 1,751,345 | 3/1930 | Matsui .......... | 239/510X |
| 3,085,249 | 4/1963 | Schweitzer et al. .......... | `39/508 |

*Primary Examiner*—Lloyd L. King
*Assistant Examiner*—Gene A. Church
*Attorney*—Jack Hensel

ABSTRACT: A device, adapted to be used with pesticide spraying equipment, intercepts a portion of the pesticide spray containing the very small droplets, coalesces said droplets and discharges them as larger desired droplets thus minimizing or preventing pesticide spray drift. A modification will intercept both the very small and the largest range droplets reforming them into medium desired range droplets.

DIRECTION OF TRAVEL
8 6 4 5 9 7 10 13 12 11 15 16 28 27 14 26 AIR 2 3 1

PATENTED FEB 16 1971
3,563,472
Fig. 1
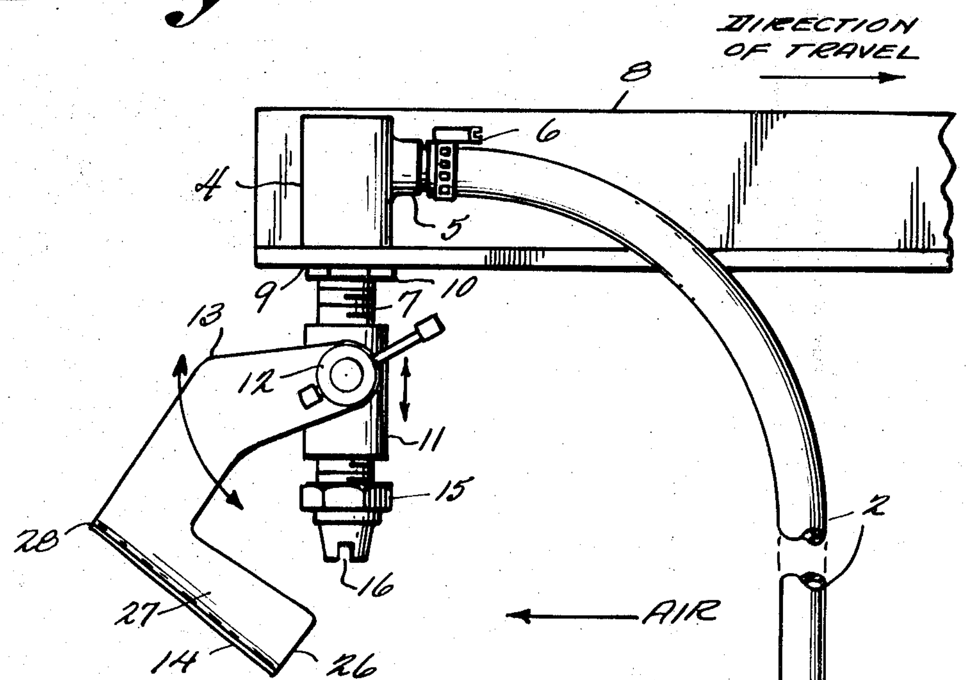
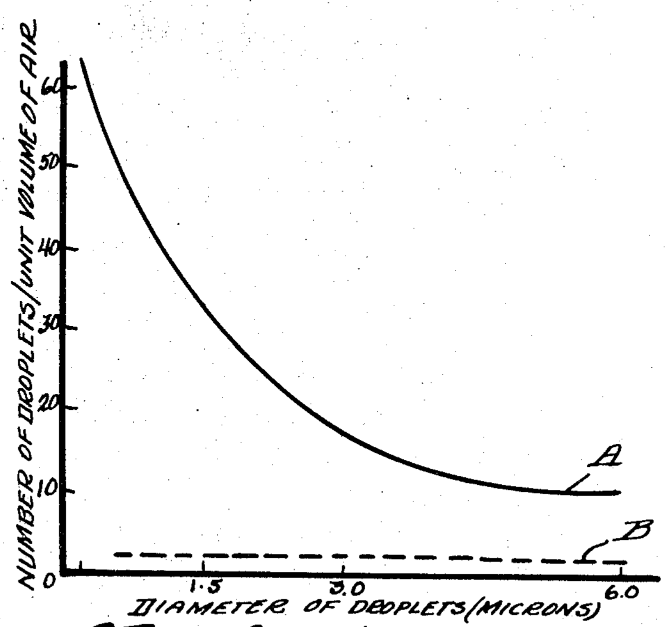
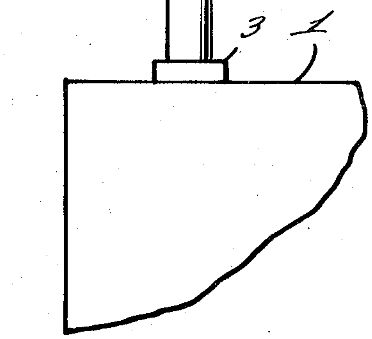
Fig. 2
INVENTOR

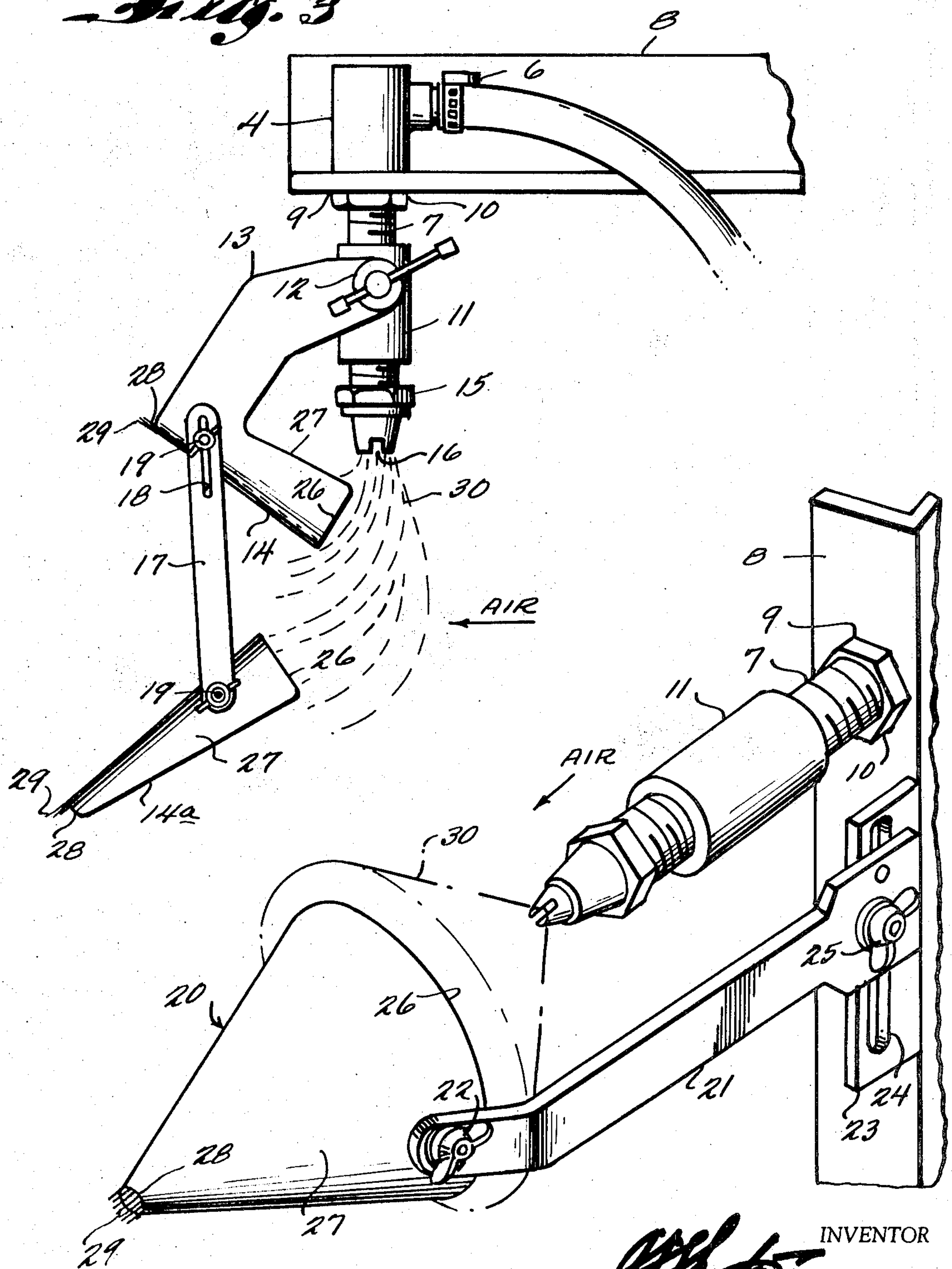
INVENTOR

APPARATUS FOR PESTICIDE SPRAYING

This invention relates to spray equipment and methods for spraying and more particularly to modifying agricultural spray equipment conventionally used to apply pesticides.

It is an object of the present invention to provide a device to be used in conjunction with agricultural spray equipment for minimizing loss of pesticide due to drift discharged into the atmosphere.

Another object is to more effectively apply the pesticide to the area to be treated by minimizing the number of large droplets which are less effective as pesticides than a substantially larger number of droplets of smaller size.

Another object is to make more efficacious the application of a pesticide spray by providing means which permit applying a specified dosage of pesticide to the area to be treated so that the droplet size of the pesticide will substantially be in a desirable range relative to the volume being applied.

Still another object is to provide a device to cause more of a pesticide being applied to strike the target area whether it be trees, crops, foliage, ground, and the like.

Other objects are to provide a method for application of toxic pesticides which will minimize the spray drift hazard to fish, wildlife, domesticated animals and humans.

Yet another object is to provide a method for applying herbicides or growth regulants to a specified area to control weeds or regulate growth on a particular crop without contaminating an adjacent area containing a herbicide sensitive crop.

Another object is to prevent waste of pesticide during application especially when application is carried out in conjunction with auxiliary air blowers or agricultural airplanes equipped with spray equipment.

Other objects of the invention are to provide a device for accomplishing the above objects which is of simple construction, has a minimum number of parts, is inexpensive to produce, efficient and simple to operate.

Heretofore, devices available for applying pesticides create a substantial amount of small droplets which are subject to drifting due to wind currents. Most devices are designed to produce small droplets to achieve as uniform a pesticide deposit on the target area as possible. With such devices a considerable number of droplets were formed which did not light upon the intended target. These very small droplets formed a cloud and in the presence of even a very slow wind the cloud moved from the intended target area to contaminate nearby areas presenting hazard to fish, wildlife, animals, and humans. In the agricultural pesticide art this moving cloud of pesticide is referred to as "spray drift."

There are instances where a phytotoxic pesticide is applied to a specific crop to control noxious weeds wherein the specific crop is tolerant to the phytotoxic pesticide and the noxious weeds are selectively controlled. Where, however, a nontolerant crop is close to the area being treated and a phytotoxic spray drift develops and comes in contact with the nontolerant crop, such crop can be seriously affected or totally destroyed. Many farmers have been paid claims for the total or partial loss of their crops which were seriously affected from pesticide spray drift resulting from applications of pesticide on neighboring farms. My invention obviates this spray drift.

Current practice in the agricultural pesticide application field employs aircraft to a very large extent to apply the pesticides to orchards, crop lands, forests, mosquito abatement districts, and to some extent to urban areas. These aircraft are equipped with pressure spray equipment including booms having nozzles through which the pesticides flow. These nozzles vary considerably in design but serve the primary purpose of creating small droplets. As stated above if some of the droplets are too small they will become spray drift and will move away from the intended target to create potential hazard or at least result in pesticide waste.

The problem of spray drift is more acute when created from an airborne source of generated spray than from land vehicle sources. This is not to say, however, that land propelled spray sources do not create spray drift, for indeed they do. It is however obvious that where spray is generated from aircraft, it is already present somewhat above the ground and furthermore the spray is subject to the relatively high speed of the aircraft and the turbulance of the planes driving force, the propeller. These additional factors in airborne sprays lead to a greater potential of spray drift.

Detailed studies have been reported which show in experiments with different pesticides, that less than 50 percent of an applied pesticide can be accounted for on the target area. It is postulated that a considerable amount of the unaccounted for pesticide forms a spray drift and consequently does not strike the target area to be detected and accounted for. My device has been developed to minimize this spray drift.

The invention is fully described in the following specifications, and several embodiments thereof illustrated in the accompanying drawings, in which:

FIG. 1 is a side elevation of a device embodying the invention;

FIG. 2 is a diagram relating the number of drift droplets to droplet size obtained with and without the aid of my device;

FIG. 3 shows two of my devices employed in tandem; and

FIG. 4 is a perspective view of a funnel-shaped modification of my device.

Referring to the drawings, 1 designates a feed tank under pressure containing the pesticide to be sprayed. A pesticide conductor tube 2 is attached to the feed tank through an apertured boss 3 and the other end of the tube is connected to the hollow spray head 4 through another apertured boss 5 connected thereto. A tube or hose clamp 6 may be used to secure the tube from slipping off its boss. A threaded pipe 7 is threadably engaged to spray head 4 or may be an integral part of spray head 4 and threadably provided. Spray head 4 is attached to a vehicle (not shown) through a mounting structure member 8 provided with an opening 9 through which pipe 7 is passed, threadably receiving lock nut 10. Sleeve 11 is disposed around pipe 7 and slidably engaged therewith as indicated by the arrows in FIG. 1. A locking device 12 attached to sleeve 11 is adapted to mount and securely hold the arms 13 of collector 14 which can be adjusted in an arcuate course as shown by the arrows in FIG. 1. When tightened locking device 12 also secures the sleeve to a desired location in its up and down travel on pipe 7. Attached to the lower end of pipe 7 is nozzle 15 having an orifice 16 which creates the pesticide spray droplets 30.

FIG. 3 is similar to FIG. 1 and in addition shows a second collector **14*a* adjustably attached to collector 14 through a connecting bracket 17 having a slot 18 provided therein for adjusting the distance between the collectors and wing nuts 19** to secure the collectors in a desired position.

FIG. 4 is another form of collector 20 having a funnel shape and is secured to mounting structure 8 by means of bracket arm 21 having a slight bend toward its outer end conforming to the slope of the funnel. Wing nut 22 adjustably secures collector 20 to bracket arm 21. Flange 23 is attached to mounting structure 8 and is provided with slot 24. Wing nut 25 secures bracket arm 21 in a fixed position in relation to slot 24.

The collectors 14, **14*a* and 20 have forward edges 26, members 27 for collecting and coalescing the intercepted portion of spray droplets and rearward edges 28, there being secured thereto or as part thereof means for discharging the coalesced portion of the intercepted spray as spray droplets. Hairlike filaments 29** as shown in FIGS. 3 and 4 are effective for discharging desired size spray droplets. Another effective means for discharging spray droplets is to provide the rearward edge of the collector with serrations. These can be in the shape similar to teeth of a household saw or of a comb for the hair.

I have discovered that it is possible to intercept and separate a substantial portion of the small range size droplets from a pesticide spray while not affecting the larger desired sized droplets which strike the intended target area. Reference to FIG. 2 illustrates the effectiveness of my device. Curve A shows graphically the relationship between the diameter of droplets measured in microns and the number of droplets per unit volume of air when said droplets are generated from a pesticide spray using the device shown in FIG. 1 without my collector device 14 attached. Curve B represents the same relationship of droplet size and number of droplets when my collector 14 is attached. In both tests the mounting member 8 and the apparatus shown in FIG. 1 were secured to a truck equipped for pesticide spraying and travelling at a speed of approximately 75 miles per hour. My device was adjusted approximately as shown with the collector slightly below and to the rearward of the orifice 16 in relation to the direction of travel of the truck. It will be observed from FIG. 2 that when my collector is attached a negligible number of droplets less than 6 microns were measured whereas without the collector many more droplets of 6 microns were observed and the number of droplets less than 6 microns vastly increased as the diameter of the droplets decreased. Droplets of about 6 microns diameter or less are known as respirable droplets and it is this size of droplets which stay suspended in the atmosphere and present a potential hazard to humans and wildlife. Since these droplets remain suspended they are subject to drafts and currents of air which can transport the pesticide droplets to unwanted areas.

I have found I can vary the position of the collector to allow for nozzle variation, relative wind speed, viscosity of the pesticide and the like to achieve the desired result.

The principle upon which my invention is based is believed to be related to the speed and mass of spray droplets discharged from an orifice and the speed of the air flow which classifies the droplets according to their mass as they are deflected by the air flow. This principle can be diagrammatically illustrated by reference to FIG. 3. A liquid feed supply (pesticide) under pressure is discharged through the orifice of a nozzle generating a spray containing droplets of varying size. An air flow is shown deflecting the discharged droplets. The smaller droplets because of their lighter mass are deflected closer to the orifice than are the larger droplets. I therefore place a collector at an appropriate point in relation to the orifice to intercept any desired size of deflected droplets.

I have furthermore discovered that when the smaller deflected droplets are intercepted they coalesce on the surface of the collector and run off the rearward edge as larger particles which are carried into the air flow.

Furthermore, I have discovered that by proper placement of the deflector to intercept the larger particles discharged from the orifice it is possible to subdivide the large droplets into several or more smaller desirable droplets.

By a combination of two collectors it is therefore possible to select droplets of a size within a desired range from a spray containing droplets larger and smaller than the desired range.

The shape of the collector can be flat or curved. Its trailing edge can be provided with comb teeth or have very thin filaments attached to assist run off droplets to take the desired size range.

FIG. 4 shows a collector of funnel-shaped design especially suited to intercept very small droplets and to be used in conjunction with a nozzle of the type for creating cone-shaped sprays. FIG. 4 shows the deflecting air flow passing in a plane parallel to the axis of the jet nozzle and discharged spray. The funnel shaped collector is positioned with its base end facing the orifice and having a common axis with the orifice. The principle of operation of the cone collector is similar to that illustrated in FIG. 3 except that the deflecting air flow is acting to deflect the smaller droplets inwardly toward the spray axis to be intercepted by the open base end of the cone. The smaller cone end of the funnel is restricted so that only a small amount of the smaller droplets deflected pass through the collector without striking the inner side of the funnel walls. The droplets which strike the walls coalesce and run toward the smaller end of the collector. In FIG. 4, the small end of the collector is shown with small filaments attached and illustrating the manner in which droplets are found on the filaments and emmited into the air flow. Where I refer to pesticides this is to be understood to include but not be limited to insecticides, miticides, fungicides, bacteriacides, herbicides, growth regulants, desiccants, defoliants, and the like.

Where reference is made to pesticide this is meant to include fluid pesticides per se as used in ULV (ultra low volume, from less than a fluid ounce to about 2 quarts per acre), LV (low volume, from about 2 quarts to 5 gals. per acre) and conventional volume (from about 5 gals. up to 1000 gals. or more per acre). Finely divided solid pesticides in suspension can also be satisfactorily applied according to this invention.

While I have described specific devices as embodiments of the invention I do not intend to be limited to the precise details shown and described. It shall be understood that modifications thereof within the spirit and scope of the present invention as defined by the appended claims can be made.

I claim:

1. A collector adapted to be mounted on a mobile apparatus for resizing pesticide spray droplets deflected by an air flow comprising a body, means on said body for clamping the body to said mobile apparatus, said body having a forward edge and a rearward edge, said forward edge mounted to project into the path of and intercept a portion of the said deflected smaller spray droplets, a member located between said forward edge and rearward edge of the body for collecting and coalescing the intercepted portion of spray droplets said rearward edge discharging the coalesced portion as larger spray droplets.

2. A method of controlling pesticide spray drift during pesticide spraying comprising spraying a pesticide into a deflecting air flow, intercepting from said deflected spray a substantial number of the smaller spray droplets and redistributing said intercepted droplets as a spray of larger droplets.

3. a method in accordance with claim 2 including the further step of coalescing the intercepted smaller deflected spray droplets to form larger droplets and control the discharge of said larger droplets into the air flow.

4. A method in accordance with claim 2 wherein a substantial number of the larger spray droplets are intercepted and redistributed as a spray of smaller droplets.